United States Patent
Laurent et al.

[11] 3,919,421
[45] Nov. 11, 1975

[54] PREGNANOIC ACID DERIVATIVES AND PROCESS FOR THE PREPARATION THEREOF

[75] Inventors: Henry Laurent; Rudolf Wiechert; Helmut Hofmeister; Klaus Mengel; Hans Wendt; Klaus Annen, all of Berlin, Germany

[73] Assignee: Schering Aktiengesellschaft, Berlin and Bergkamen, Germany

[22] Filed: Dec. 20, 1973

[21] Appl. No.: 426,702

[52] U.S. Cl. .......................... 424/241; 260/239.55 D
[51] Int. Cl.² ........................................... C01B 7/00
[58] Field of Search ........................... 260/239.55 D

[56] References Cited
UNITED STATES PATENTS

| | | |
|---|---|---|
| 3,833,563 | 9/1974 | Laurent et al. ............ 260/239.55 |
| 3,875,194 | 4/1975 | Laurent et al. ............ 260/239.55 |

*Primary Examiner*—Elbert L. Roberts
*Attorney, Agent, or Firm*—Millen, Raptes & White

[57] ABSTRACT

Pharmacologically active pregnanoic acid derivatives of the Formula I

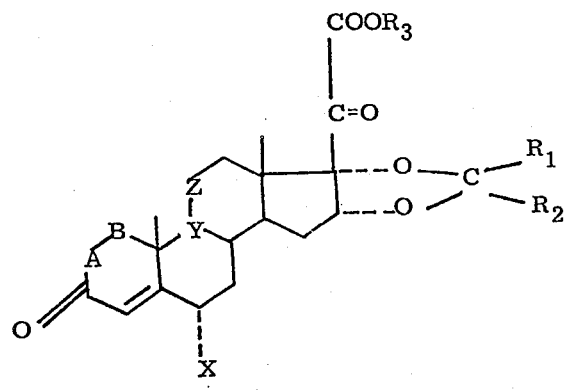

wherein —A—B— is —$CH_2$—$CH_2$—, —CH=CH—, or —CCl=CH—; X is a hydrogen atom, a halogen atom, or methyl; —Y—Z— is —CH—$CH_2$—, —C=CH—, —CV—CHOU—, —CV—CO—, —CW—CHW'—, wherein U is a hydrogen atom or acyl, V is a hydrogen atom or a halogen atom, and W and W' each are a halogen atom; $R_1$ is alkyl; $R_2$ is alkyl or aryl; or, $R_1$ and $R_2$ together represent a tetramethylene group or pentamethylene group; $R_3$ is a hydrogen atom, an alkali metal atom, or a hydrocarbon.

The invention also comprises the process of producing the compounds by various procedures.

74 Claims, No Drawings

PREGNANOIC ACID DERIVATIVES AND PROCESS FOR THE PREPARATION THEREOF

BACKGROUND OF THE INVENTION

This invention relates to novel pregnanoic acid derivatives of the general Formula I

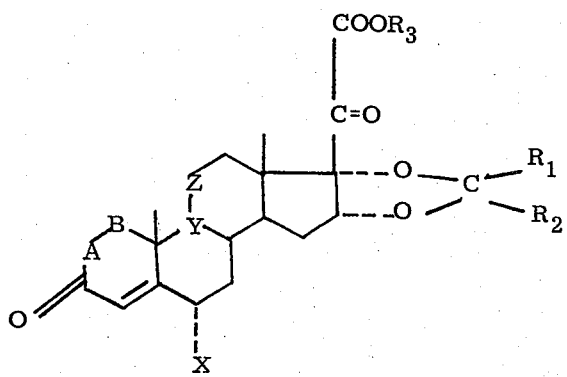

wherein —A—B— is —$CH_2$—$CH_2$—, —CH=CH—, or —CCl=CH—; X is a hydrogen atom, a halogen atoms, or methyl; —Y—Z— is —CH—$CH_2$—, —C=CH—, —CV—CHOU—, —CV—CO—, —CW—CHW'—, wherein U is a hydrogen atom or acyl, V is a hydrogen atom or halogen atom, and W and W' each are a halogen atom; $R_1$ is alkyl; $R_2$ is alkyl or aryl; or, $R_1$ and $R_2$ together represent a tetramethylene group or pentamethylene group; $R_3$ is a hydrogen atom, an alkali metal atom, or a hydrocarbon.

SUMMARY OF THE INVENTION

The invention relates to the novel pregnanoic acid derivatives of general Formula I and to the preparation thereof. The preparation of the derivatives in accordance with the invention can be accomplished in several variant processes as follows:

Process Variant (a) - a compound of the general Formula II

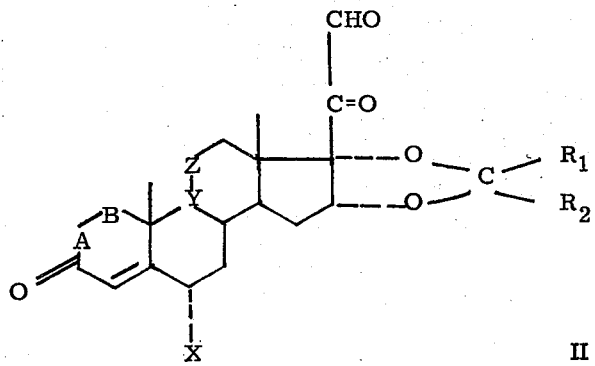

wherein —A—B—, X, —Y—Z—, $R_1$, and $R_2$ have the same values given in Formula I or a hydrate or hemiacetal thereof, is oxidized with an oxidizing heavy metal oxide in the presence of an alcohol; or Process Variant (b) - a compound of the general Formula III

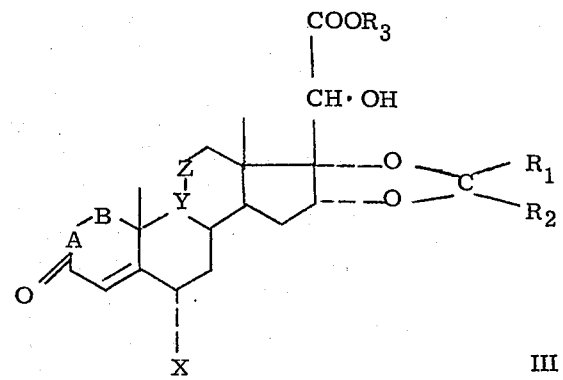

wherein —A—B—, X, —Y—Z—, $R_1$, $R_2$ and $R_3$ have the same values given in Formula I the 20- hydroxy group can be in the $\alpha$ or $\beta$-position, is oxidized in an inert solvent with an oxidizing metallic oxide or metallic salt; or Process Variant (c) - for producing the 9-halo steroids of general Formula I, a halogen, hypochlorous or hypobromous acid is chemically added in a conventional manner to the $\Delta^{9(11)}$-double bond of a compound of the general Formula IV

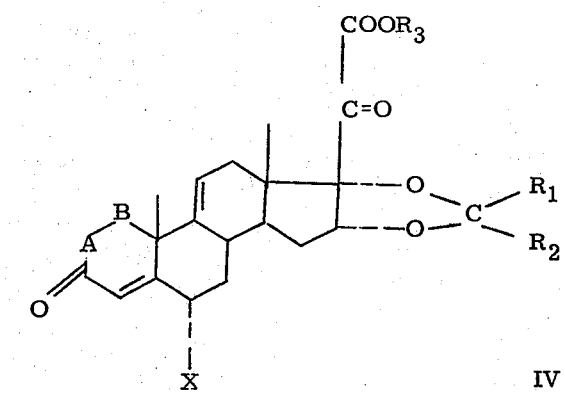

wherein —A—B, X, $R_1$, $R_2$, and $R_3$ have the same values given in Formula I and optionally the $9\alpha$-halo-$11\beta$-hydroxy steroids obtained are converted into the $9,11\beta$-epoxide, and the latter is opened with hydrogen fluoride; or Process Variant (d) - for producing $\Delta^{1,4}$ steroids of Formula I, compounds of Formula I, saturated in the 1,2-position, are conventionally dehydrogenated; and if desired, the 11-hydroxy steroids of Formula I are esterified or oxidized to the 11-ketones; esters of general Formula I are reacted, in the presence of basic catalysts, with the finally desired alcohol; or these esters are saponified and optionally again esterified.

DETAILED DISCUSSION

In the above Formula I, the halogen atom X, V, W, and W' is preferably fluorine, chlorine, or bromine. When U is acyl, it is preferably alkanoyl of 1–6 carbon atoms, e.g., formyl, acetyl, propionyl, and butyryl.

The alkyls of $R_1$ and $R_2$ are preferably lower alkyls of 1–6 carbon atoms, e.g., methyl, ethyl, propyl, isopropyl, and butyl. The aryl of $R_2$ is preferably phenyl, which optionally can be substituted with, a lower alkyl of 1–4 carbon atoms, e.g., methyl, ethyl, ispropyl, or lower alkoxy, such as methoxy, etc. When $R_3$ is a hydrocarbon, it can be any hydrocarbon group of 1–8 carbon atoms preferably 1–12 carbon atoms. The hydrocarbon group can be aliphatic, e.g., alkyl, or cycloaliphatic, perferably moncyclic or aralkyl, saturated or unsaturated, and substituted or unsubstituted. When $R_3$ is a substituted hydrocarbon group it can be substituted with, e.g., lower alkyl, such as, methyl, ethyl, propyl, isopropyl, butyl, or tert.-butyl; aryl, e.g., phenyl; cycloakyl, e.g., cyclopropyl, cyclopentyl, or cyclohexyl; hydroxy; lower alkoxy, e.g., methoxy, ethoxy, propoxy, butoxy, or tert.-butoxy; a free or esterified carboxy, and the sodium and potassium salts thereof; amino and the salts thereof; or mono- or di-lower-alkylamino e.g., the methylamino, dimethylamino, ethylamino, diethylamino, propylamino, or butylamino and the salts thereof. Preferred salts of amino, mono-lower-alkylamino, or di-lower-alkylamino, are the hydrochlorides, hydrobromides, sulfates, phosphates, oxalates, maleates, or tartrates.

Suitable examples for $R_3$ are: methyl, carboxymethyl, ethyl, 2-hydroxyethyl, 2-methoxyethyl, 2-aminoethyl, 2-dimethylaminoethyl, 2-carboxyethyl, propyl, allyl, cyclopropylmethyl, isopropyl, 3-hydroxypropyl, 3-aminopropyl, butyl, sec.-butyl, tert.-butyl, -butyl, 2-butyl, cyclobutyl, pentyl, isopentyl. tert.-pentyl, 2-methylbutyl, cyclopentyl, hexyl, cyclohexyl, cyclohex-2-enyl, cyclopentylmethyl, heptyl, benzyl, 2-phenylethyl, octyl, bornyl, isobornyl, menthyl, nonyl, decyl, 3-phenylpropyl, 3-phenylprop-2-enyl, dodecyl, tetradecyl, hexadecyl, octadecyl, etc.

Suitable oxidizing heavy metal oxides for the process according to process variant (a) are, for example, silver oxide, lead (IV) oxide, minium, ($Pb_3O_4$) vanadium (V) oxide, manganese (IV) oxide, or chromium (VI) oxide, but the latter is utilized only if the compounds of general Formula II do not have an 11-hydroxy group. The reaction is accomplished by using preferably 0.5 –50 g. and particularly 1 – 10 g. of heavy metal oxide per gram of compound II. Alcohols usable for process variant (a) are alchohls of the formula $R_2OH$, wherein $R_2$ has the same meaning as in Formula I. Especially preferred alcohols are lower and intermediate, primary or secondary alcohols having 1–8 carbon atoms in the alcohol residue. Suitable such alcohols include but are not limited to methanol, ethanol, propanol, isopropanol, butanol, isobutanol, sec.-butanol, amyl alcohol, isoamyl alcohol, hexanol, heptanol, or octanol. Excess alcohol can also be used simultaneously as the reaction solvent, although it is of course also possible to admix inert solvents to the reaction mixture is addition to the alcohols. Suitable inert solvents are known in the art and include but are not limited to hydrocarbons, e.g., benzene, cyclohexane, or toluene; chlorinated hydrocarbons, e.g., methylene chloride, chloroform, or tetrachloroethane; ethers, e.g., diethyl ether, diisopropyl ether, dibutyl ether, glycol dimethyl ether, dioxane, or tetrahydrofuran; dipolar aprotic solvents, e.g., dimethylformamide, N-methylacetamide, or N-methylpyrrolidone; etc.

When conducting the process in accordance with process variant (a), a significant increase in the reaction velocity and a significant increase in yield are surprisingly obtained, if the reaction step if conducted with the addition of cyanide ions as the catalyst. Reagents yielding cyanide ions are preferably alkali cyanides, e.g., sodium or potassium cyanide. Preferably, 0.01–10 moles, and particularly 0.1–1.0 mole, of cyanide is employed per mole of compound of Formula II. When alkali cyanides are used as the reagents yielding cyanide ions, the reaction is advantageously effected in adding to the reaction mixture a required amount of a mineral acid (e.g., sulfuric acid, phosphoric acid, or hydrogen chloride), a sulfonic acid (e.g., p-toluenesulfonic acid), or a carboxylic acid (e.g., formic acid or acetic acid) to neutralize the alkali cyanide.

The above preferred embodiment of process variant (a) can be suitably conducted at a reaction temperature of between −20° and +100°C., and preferably at a reaction temperature of between 0°C. and +50°C. The reaction time is dependent on the reaction temperature and the particular selected reactants, and in the preferred embodiment of process variant (a), this time is on the average of about 5–120 minutes.

It is to be noted that the compounds of general Formula II can also be converted into the compounds of general Formula I by the use of other oxidizing agents. Thus, it is possible, for example, to employ as the oxidizing agent, 5,6-dichloro- 2,3-dicyanobenzoquinone, or triphenyltetrazolium chloride; however, the use of these oxidizing agents involve an essentially more complicated process than the process according to the above process variant (a).

The starting compounds for process variant (a) can be easily obtained from the correspondinig 21-hydroxy steroids b reacting the latter with lower alcohols, such as methanol, ethanol, or butanol, in the presence of copper (II) acetate for 10–120 minutes at room temperature. The compounds obtained after the reaction mixture has been worked up as usual can serve directly as the starting compounds for the process of the present invention.

The compounds of general Formula I can also be produced according to the process variant (b) wherein the process is conducted in inert solvents which are customarily utilized in oxidation reactions of steroid chemistry. Suitable inert solvents include but are not limited to e.g., hydrocarbons, e.g., cyclohexane, benzene, toluene, or xylene; chlorinated hydrocarbons, e.g., methylene chloride, chloroform, carbon tetrachloride, tetrachloroethylene, or chlorobenzene; ethers, e.g., diethyl ether, diisopropyl ehter, cibutyl ether, tetrahydrofuran, dioxane, glycol dimethyl ether, or anisole; ketones, e.g., acetone, methyl ethyl ketone, methyl isobutyl ketone, or acetophenone; or alcohols, e.g., methanol, ethanol, isopropanol, or tert.-butanol, and mixtures of the aforementioned solvents.

Process variant (b) can be conducted with the use of manganese (IV) oxide or lead (IV) oxide. In order to obtain high yields, active manganese (IV) oxide is preferably utilized for this process variant, as is customary in oxidation reactions of steroid chemistry.

The reaction according to process variant (b) is conducted preferably at a reaction temperature of between 0° C. and 150°C. Thus, it is possible for example, to oxidize the compounds of general Formula III at room temperature or at the boiling temperature of the solvent employed.

In the starting compounds of general Formula III, the configuration of the 20-hydroxy group is without significance for the applicability of the process variant (b) of this invention. Therefore, it is possible to convert the $20\alpha$-hydroxy steriods of general Formula III, the $20\beta$-hydroxy steroids of general Formula III, and also mixtures thereof in the same manner into the pregnanoic acid derivatives of general Formula I using the process variant (b) of the present invention.

The starting compounds of process variant (b) can be prepared from the corresponding 21-hydroxy-20-oxo-pregnane derivatives. For this purpose, the latter are dissolved in a suitable alcohol, the solution is combined with copper (II) acetate, and the mixture stirred for several days at room temperature. The mixture is then mixed with aqueous ammonia, extracted, for example, with methylene chloride, the organic phase is washed with water, dried, and concentrated under vacuum. In this manner, a crude product is obtained consisting of a mixture of the 20α- and 20 β-hydroxy steroids. This mixture can be employed without further purification as the starting compound for the process variant (b) of this invention.

The 9-halo steroids of general Formula I can also be produced in accordance with process variant (c) wherein the $\Delta^{9(11)}$-steroids of general Formula I are utilized as the starting compounds which, in turn, can be prepared from the correspondning 21-hydroxy steroids with the aid of the process according to either variant (a) or (b).

For the chemical addition of halogen to the $\Delta^{9(11)}$-double bond, there are a number of possibilities. Thus, it is possible, for example, to directly add to the double bond halogens, such as chlorine, or bromine, or compounds of the halogens with one another, e.g., chloromonofluoride or bromomonochloride, or halogen from polyhalogenides, such as, for example, potassium triiodide or dichloro, iodobenzene.

The halogen addition is especially successful if simultaneously a positive and a negative halogen are allowed to be effective on the $\Delta^{9(11)}$-steroids. Reagents containing positive hab gen are, for example: halosuccinimides, haloacetamindes, or the halogens themselves; reagents yielding negative halogen are, for example: hydrogen halides and alkali metal halides, especially lithium halides, e.g., lithium chloride and lithium bromide.

The addition of halogens to the $\Delta^{9(11)}$-double bond of the steriod always takes place so that the positively charged halogen is added to the 9-position and the negatively charged halogen is added to the 11-position of the molecule. The atomic weight of the halogen in the 9-position can never be smaller than that of the halogen in the 11-position, because of the known, different electronegativity of the halogens. The halogen addition to the $\Delta^{9(11)}$-double bond is preferably accomplished at tempertures of between −75° and +50°C.

The addition of hypochlorous or hypobromous acid to the $\Delta^{9(11)}$-double bond of the compounds takes place according to the operating methods generally known for this purpose. A preferred method is the treatment of the $\Delta^{9(11)}$-double bond with reagents liberating hypochlorous or hypobromous acid in the presence of water and in an acidic reaction medium during the course of the reaction, i.e., especially reagents forming halogen cations, e.g., dibromomethylhydantoin, N-haloacylamides, particularly N-chloro- or N-bromoacetamide, or N-haloacylimides, especially N-bromo- or N-chlorosuccinimide.

If the ultimate desired products are 9α-fluoro compounds, then, after the addition of hypohalogenite to the 9,11-double bond has taken place, the 9α-bromo- (or -chloro-) 11β-hydroxy group is closed in a likewise conventional manner to the 9,11-oxide ring, for example by treatment with basic reagents, such as sodium hydroxide, potassium hydroxide, potassium carbonate, potassium acetate, pyridine, and similar substances, at a preferably elevated reaction temperature; and the 9,11-oxido ring is subsequently converted into the 11α-hydroxy-9β-fluoro group by means of hydrofluoric acid. Similarly, if desired, the 9α-bromo-11β-hydroxy steroids of Formula I can be converted into the 9α-chloro-11β-hydroxy steroids, if the epoxide ring is not opened with hydrogen fluoride, but with hydrogen chloride. During this reaction, any ester groups present in the 21-position can optionally be saponified.

Using process variant (d), it is possible to dehydrogenate the steroids of general Formula I saturated in the 1,2-position to the corresponding $\Delta^{1,4}$-steroids. This dehydrogenation is accomplished by conventional procedures. A typical procedure is the chemical dehydrogenation by means of selenium dioxide or quinones, such as 2,3-dichloro-5,6-dicyanobenzoquinone.

When using selenium dioxide, suitable solvents are, for example, tert.-butanol, tert.-amyl alcohol, or ethyl acetate. The reaction can be accelerated by the addition of small amount of glacial acetic acid and is accomplished by heating the reaction mixture under reflux. The reaction is terminated after about 10–50 hours.

Using 2,3-dichloro-5,6-dicyanobenzoquinone, the reaction is conducted advantageously also at the boiling temperature of the solvent employed. Suitable solvents, are, for example, alcohols (e.g., ethanol, butanol, and tert.-butanol, ethyl acetate, benzene, dioxane, tetrahydrofuran, etc. In order to accelerate the reaction, minor amounts of nitrobenzene or p-nitrophenol can be added. The reaction times are between 5 and 50 hours.

When alchols are employed as solvents for the dehydrogenation, it is advantageous to utilize alcohols of the formula $R_2OH$ — wherein $R_2$ has the same significance as in Formula I.

The oxidation of the 11α-hydroxy steroids of general Formula I to the corresponding 11-ketones is achieved according to known optional methods of operation, for example, by means of chromic acid.

The optional known methods for the subsequent conventional saponification of the 21-esters can involve, for example, the saponification of the esters in water or aqueous alcohols in the presence of acidic catalysts, e.g., hydrochloric acid, sulfuric acid, p-toluenesulfonic acid, or in the presence of basic catalysts, e.g., potassium bicarbonate, potassium carbonate, socium hydroxide, or potassium hydroxide.

The following optional esterification of the free acids takes place similarly in accordance with known methods. Thus, the acids can be reacted, for example, with diazomethane or diazoethane, thereby obtaining the corresponding methyl or ethyl esters. A generally applicable method is the reaction of the acids with the alcohols in the presence of carbonyl diimidazole, dicyclohexycarbodiimide, or trifluoroacetic acid anhydride. Furthermore, it is possible, for example, to react the acids in the presence of copper (I) oxide or silver oxide with alkyl halogenides.

A further method involves the conversion of free acids with the corresponding dimethylformamide alkyl acetals, into the corresponding acid alkyl esters. Also, the acids can be reacted in the presence of strongly acidic catalysts, such as hydrogen chloride, sulfuric acid, perchloric acid, trifluoromethylsulfonic acid, or p-toluenesulfonic acid, with the alcohols or the lower alkanecarboxylic acid ester of the alcohols. It is similarly possible to convert the carboxylic acids into the acid chlorides or acid anhydrides and react these with the alcohols, in the presence of basic catalysts The salts of the carboxylic acids are produces, for example, during the saponification of the esters by means of basic catalysts or during the neutralization of the acids by means of alkali carbonates or alkali hydroxides, e.g., sodium carbonate, sodium bicarbonate, sodium hydroxide, potassium carbonate, potassium bicarbonate, or potassium hydroxide.

It is furthermore possible to react esters of general Formula I with the ultimate desired alcohol, in the presence of basic catalysts. In this manner, the preferred basic catalysts are alkali, alkaline earth, or aluminum alcoholates. This reaction is preferably accomplished at a reaction temperature of between 0°C. and 180°C. and the ultimate desired alcohol is used is an excess. Preferably 10–1000 moles of alcohol per mole of steroid is utilized. The alcohol can be optionally diluted with additional solvents, e.g., ethers (e.g., di-n-butyl ether), tetrahydrofuran, dioxane, glycol dimethyl ether, or dipolar aprotic solvents, such as dimethylformamide, N-methylacetamide, dimethyl sulfoxide, N-methylpyrrolidone, or acetonitrile. This variant of the reaction is conducted so that, per mole of steriod, less than one mole of basic catalyst is preferably employed. In particular, to carry out this reaction, 0.0001–0.5 mole of basic catalyst is used per mole of steriod.

When 11β-acyloxy compounds of general Formula II or III are utilized as staring compounds for the process of this invention, these can be produced in a simple manner by saponifying the corresponding 11β, 21-diacyloxy compounds under gentle conditions (e.g., by treatment with calcium carbonate in an alcoholic solution) and then converting the thus-obtained 11β-acyloxy-21-hydroxy steroids, as above described, into the corresponding 21-aldehydes or 21-acids.

The compounds of general Formula I are valuable medicinal agents or valuable intermediates for the production of medicinal agents. The pharmacologically effective compounds of general Formula I posses, upon local administration, an excellent antiphlogistic activity and moreover have the advantage that they are practically ineffective upon systemic application.

The novel compounds are suitable, in combination with the vehicles customary in galenic pharmacy for the local treatment of contact dermatitis, eczemas of a great variety of types, neurodermatoses, erythrodermia, burns, ·pruritus vulvae et ani, rosacea, erythematodes cutaneus, psoriasis, lichen rubber planue et varrucosus, and similar skin diseases.

The special drug preparation are produced in the usual manner by converting the effective agents with suitable additives into the desired forms of application, such as, for example: solutions, lotions, ointments, creams, or plasters. In the thus-formulated drugs, the effective agent concentration is dependent on the form of administration. In case of lotions and ointments, an effective agent concentration of 0.001 to 1% is preferably utilized.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1 a. A solution of 2.0 g. of 9α-fluoro-11β, 21-dihydroxy-16α, 17α-isopropylidenedioxy-1,4-pregnadiene-3,20-dione in 250 ml. of methanol is combined with 500 mg. of copper (II) acetate in 250 ml. of methanol, and the mixture is stirred for 30 minutes while passing air therethrough. The reaction mixture is diluted with dichloromethane, washed with dilute ammonium chloride solution and water, dried with sodium sulfate, and evaporated under vacuum. The yield is 2.1 g. of 9α-fluoro-11α-hydroxy-16α, 17α-isopropylidenedioxy-3,20-dioxo-1,4-pregnadien-21-al as the crude product.

b. 1.0 g. of the thus-obtained aldehyde is dissolved in 50 ml. of methanol and 10 ml. of dichlormethane, and the solution is agitated for 5 minutes after adding 160 mg. of potassium cyanide, 1.0 ml. of acetic acid, and 2.0 g. of manganese (IV) oxide. The manganese (IV) oxide is filtered off, the filtrate is diluted with dichloromethane, washed with water, dried, and evaporated under vacuum. The residue is chromatographed on silica gel with a methylene chloride/acetone gradient (0–30% acetone). Yield: 578 mg. of the methyl ester of 9α-fluoro-11α-hydroxy-16α, 17α-isopropylidenedioxy-3,20-dioxo-1,4-pregnadien-21-oic acid; m.p. 325°C. (under decomposition). $[\alpha]_D^{25} = +55°$ (chloroform). UV: $\epsilon_{238} = 15,600$ (methanol).

EXAMPLE 2

A solution of 10 g. of 9α-fluoro-11β, 12-dihydroxy-16α, 17α-isopropylidenedioxy-1,4-pregnadiene-3,20-dione in 1000 ml. of methanol is combined with 5 g. of copper (II) acetate, and the mixture is stirred for 120 hours at room temperature. The solution is concentrated under vacuum and the residue taken up in dichloromethane. The solution is then washed with 10% strength ammonium hydroxide solution and water, dried, and evaporated. The thus-obtained mixture of the methyl ester of 9α-fluoro-11β, 20α-dihydroxy-16α,17α-isopropylidenedioxy-3-oxo-1,4-pregnadien-21-oic acid and the methyl ester of 9α-fluoro-11β, 20β-dihydroxy-16α,17α-isopropylidenedioxy-3-oxo-1,4-pregnadien-21-oic acid is dissolved in 500 ml. of dichloromethane, mixed with 500 g. of manganese (IV) oxide, and stirred for 24 hours at room temperature. After filtration, the reaction mixture is concentrated and the residue chromatographed on silica gel. With 8–12% acetone/methylene chloride, after recrystallization fro acetone-hexane, the product thus obtained is 1.73 g. of the methyl ester of 9α-fluoro-11β-hydroxy-16α,17α-isopropylidenedioxy-3,20-dioxo-1,4-pregnadien-21-oic acid; m.p. 324°C. (under decomposition). $[\alpha]_D^{25} = +53°$ (chloroform). UV: $\epsilon_{238} = 16,100$ (methanol).

EXAMPLE 3

2.1 g. of 9α-fluoro-11α-hydroxy-16α,17α-isopropylidenedioxy-3,20-dioxo-1,4-pregnadien-21-al is reacted under the conditions described in Example 1(b), but with the use of butanol. Yield: 585 mg. of the butyl ester of 9α-fluoro-11β-hydroxy-16α,17α-isopropylidenedioxy-3,20-dioxo-1,4-pregnadien-21-oic acid: m.p. 281°C. (under decomposition). $[\alpha]_D^{25} = +47°$ (chloroform). UV: $\epsilon_{238} = 16,000$ (methanol).

EXAMPLE 4

5.0 g. of 9α-fluoro11 1β-hydroxy-16α,17α-isopropylidenedioxy-3,20-dioxo-1,4-pregnadien-21-al is reacted under the conditions set forth in Example 1(b), but in pentanol. Yield: 2.58 g. of the pentyl ester of 9α-fluoro-11α-hydroxy-16α,17α-isopropylidenedioxy-3,20-dioxo-1,4-pregnadien-21-oic acid; m.p. 247° C. $[\alpha]_D^{25}$ = +45° (chloroform). UV: $\epsilon_{238}$ = 15,900 (methanol).

EXAMPLE 5

A solution of 500 mg. of the pentyl ester of 9 α-fluoro-11β-hydroxy-16α,17α-isoproplidenedioxy-3,20-dioxo-1,4-pregnadien-21-oic acid in 80 ml. of propanol is mixed with 100 mg. of potassium tert.-butylate and agitated under nitrogen for 5 hours at room temperature. The solution is diluted with dichloromethane, washed with dilute acetic acid, sodium bicarbonate solution, and water, dried over sodium sulfate, and evaporated under vacuum. The crude product is recrystallized from acetone-hexane. Yield: 230 mg. of the propyl ester of 9α-fluoro-11β-hydroxy-16α,17α-isopropylidenedioxy-3,20-dioxo-1,4-pregnadien-21-oic acid; m.p. 285° C. (under decomposition). $[\alpha]_D^{25}$ = +49° (chloroform). UV: $\epsilon_{238}$ = 15,900 (methanol).

EXAMPLE 6

Under the conditions disclosed in Example 5, 500 mg. of the pentyl ester of 9α-fluoro-11β-hydroxy-16α,17α-isopropylidenedioxy-3,20-dioxo-1,4-pregnadien-21-oic acid is converted with isopropyl alcohol into the isopropyl ester of 9α-fluoro-11β-hydroxy-16α,17α-isopropylidenedioxy-3,20-dioxo-1,4-pregnadien-21-oic acid. Yield: 291 mg. Melting point: 286° C. (under decomposition). $[\alpha]_D^{25}$ = +51° (chloroform). UV: $\epsilon_{238}$ = 15,900 (methanol).

EXAMPLE 7

Under the conditions described in Example 5, 350 mg. of the pentyl ester of 9α-fluoro-11β-hydroxy-16α,17α-isopropylidenedioxy-3,20-dioxo-1,4-pregnadien-21-oic acid is converted with ethanol into the ethyl ester of 9α-fluoro-11β-hydroxy-16α,17α-isopropylidenedioxy-3,20-dioxo-1,4-pregnadien-21-oic acid. Yield: 119 mg.; m.p. 288° C. (under decomposition). $[\alpha]_D^{25}$ = +46° (chloroform). UV: $\epsilon_{238}$ = 15,700 (methanol).

EXAMPLE 8

100 mg. of the methyl ester of 9α-fluoro-11β-hydroxy-16α,17α-isopropylidenedioxy-3,20-dioxo-1,4-pregnadien-21-oic acid is converted, under the conditions set forth in Example 5, with decanol into the decyl ester of 9α-fluoro-11β-hydroxy-16α,17α-isopropylidenedioxy-3,20-dioxo-1,4-pregnadien-21-oic acid. Yield: 110 mg. of an oil which does not crystallize.

EXAMPLE 9

250 mg. of the methyl ester of 9α-fluoro-11β-hydroxy-16α,17α-isopropylidenedioxy-3,20-dioxo-1,4-pregnadien-21-oic acid is converted, under the conditions set forth in Example 5, with 2-propen-1-ol, into the 2-propenyl ester of 9α-fluoro-11β-hydroxy-16α,17α-isopropylidenedioxy-3,20-dioxo-1,4-pregnadien-21-oic acid. Yield: 183 mg.

EXAMPLE 10

250 mg. of the pentyl ester of 9α-fluoro-11β-hydroxy-16α,17α-isopropylidenedioxy-3,20-dioxo-1,4-pregnadien-21-oic acid is converted, under the conditions set forth in Example 5, with 2-propyn-1-ol, into the 2-propynyl ester of 9α-fluoro-11β-hydroxy-16α,17α-isopropylidenedioxy-3,20-dioxo-1,4-pregnadien-21-oic acid. Yield: 120 mg.

EXAMPLE 11

A solution of 810 mg. of the pentyl ester of 9α-fluoro-11β-hydroxy-16α,17α-isopropylidenedioxy-3,20-dioxo-1,4-pregnadien-21-oic acid in 50 ml. of dichloromethane and 60 ml. of methanol is mixed with a solution of 960 mg. of potassium hydroxide in 5 ml. of water; the mixture is agitated under nitrogen for 30 minutes at room temperature. The alkaline reaction solution is then mixed with water and extracted with dichloromethane. The aqueous phase is acidified with 2N hydrochloric acid and likewise extracted with dichloromethane. The second dichloromethane phase is washed with water, dried, and evaporated under vacuum at 30° 1 C. The residue is taken up in a small quantity of tetrahydrofuran and mixed with ethyl acetate until the onset of crystallization, thus obtaining 490 mg. of 9α-fluoro-11β-hydroxy-16α,17α-isopropylidenedioxy-3,20-dioxo-1,4-pregnadien-21-oic acid, m.p. 293° C. (under decomposition). $[\alpha]_D^{25}$ = +57° (pyridine). UV: $\epsilon_{238}$ = 15,300 (methanol).

EXAMPLE 12

100 mg. of 9α-fluoro-11β-hydroxy-16α,17α-isopropylidenedioxy-3,20-dioxo-1,4-pregnadien-21-oic acid is dissolved in 15 ml. of methanol and mixed with 2.23 ml. of a N/10 solution of potassium hydroxide in methanol. The solvent is extensively evaporated under vacuum, and the residue is mixed with 25 ml. of ether. The thus-precipitated sodium salt of 9α-fluoro-11β-hydroxy-16α,17α-isopropylidenedioxy-3,20-dioxo-1,4-pregnadien-21-oic acid is vacuum-filtered and dried under vacuum. Yield: 93 mg.

EXAMPLE 13

1.0 g. of 6α,9α-difluoro-11β,21-dihydroxy-16α,17α-isopropylidenedioxy-1,4-pregnadiene-3,20-dione is oxidized, under the conditions indicated in Example 1(a), to 6α,9α-difluoro-11β-hydroxy-16α,17α-isopropylidenedioxy-3,20-dioxo-1,4-pregnadien-21-al; 500 mg. of the thus-obtained product is converted, according to the method set forth in Example 1(b), into the methyl ester of 6α,9α-difluoro-11β-hydroxy-16α,17α-isopropylidenedioxy-3,20-dioxo-1,4-pregnadien-21-oic acid. Yield: 277 mg., m.p. 314° C. (under decomposition). $[\alpha]_D^{25}$ = +43° (chloroform). UV: $\epsilon_{238}$ = 16,500 (methanol).

EXAMPLE 14

500 mg. of 6α,9α-difluoro-11β-hydroxy-16α,17α-isopropylidenedioxy-3,20-dioxo-1,4-pregnadien-21-al is converted, under the conditions set forth in Example 1(b), but in butanol and with the use of vanadium(V) oxide, into the butyl ester of 6α,9α-difluoro-11β-hydroxy-16α,17α-isopropylidenedioxy-3,20-dioxo-1,4-pregnadien-21-oic acid. Yield: 364 mg.; m.p. 293° C. (under decomposition). $[\alpha]_D^{25}$ = +40° (chloroform). UV: $\epsilon_{238}$ = 16,400 (methanol).

EXAMPLE 15

Under the conditions set forth in Example 1(a), 500 mg. of 6α-fluoro-9α-chloro-11β,21-dihydroxy-16α,17α-isopropylidenedioxy-1,4-pregnadiene-3,20-dione is oxidized to the 21-aldehyde, and the latter, under the conditions set forth in Example 1(b), is converted with butanol into the butyl ester of 6α-fluoro-9α-chloro-11β-hydroxy-16α,17α-isopropylidenedioxy-3,20-dioxo-1,4-pregnadien-21-oic acid. Yield: 336 mg.; m.p. 296° C. (under decomposition). $[\alpha]_D^{25} = +68°$ (chloroform). UV: $\epsilon_{238} = 16,100$ (methanol).

EXAMPLE 16

150 mg. of the butyl ester of 6α-fluoro-9α-chloro-11β-hydroxy-16α,17α-isopropylidenedioxy-3,20-dioxo-1,4-pregnadien-21-oic acid is converted in methanol, under the conditions described in Example 5, into the methyl ester of 6α-fluoro-9α-chloro-11β-hydroxy-16α,17α-isopropylidenedioxy-3,20-dioxo-1,4-pregnadien-21-oic acid. Yield: 98 mg.; m.p. 329° C. (under decomposition). $[\alpha]_D^{25} = +74°$ (chloroform). UV: $\epsilon_{238} = 16,200$ (methanol).

EXAMPLE 17

Under the conditions indicated in Example 1, 3.0 g. of 6α-fluoro-11β,21-dihydroxy-16α,17α-isopropylidenedioxy-1,4-pregnadiene-3,20-dione is oxidized to the aldehyde, and the latter is converted with ethanol into the ethyl ester of 6α-fluoro-11β-hydroxy-16α,17α-isopropylidenedioxy-3,20-dioxo-1,4-pregnadien-21-oic acid. Yield: 1.56 g., m.p. 279° C. (under decomposition). $[\alpha]_D^{25} = +51°$ (chloroform). UV: $\epsilon_{242} = 16,300$ (methanol).

EXAMPLE 18

Under the conditions set forth in Example 5, 750 mg. of the ethyl ester of 6α-fluoro-11β-hydroxy-16α,17α-isopropylidenedioxy-3,20-dioxo-1,4-pregnadien-21-oic acid is converted with butanol into the butyl ester of 6α-fluoro-11β-hydroxy-16α,17α-isopropylidenedioxy-3,20-dioxo-1,4-pregnadien-21-oic acid. Yield: 451 mg., m.p. 294° C. (under decomposition). $[\alpha]_D^{25} = +54°$ (chloroform). UV: $\epsilon_{242} = 16,600$ (methanol).

EXAMPLE 19

150 mg. of 6α-fluoro-9α,11β-dichloro-16α,17α-isopropylidenedioxy-1,4-pregnadiene-3,20-dione is converted, under the conditions set forth in Example 1, via the corresponding 21-aldehyde into the methyl ester of 6α-fluoro-9α,11β-dichloro-16α,17α-isopropylidenedioxy-3,20-dioxo-1,4-pregnadien-21-oic acid. Yield: 86 mg., m.p. 330° C. (under decomposition). $[\alpha]_D^{25} = +86°$ (chloroform). UV: $\epsilon_{237} = 15,900$ (methanol).

EXAMPLE 20

Under the conditions set forth in Example 1(a), 75 mg. of 6α-fluoro-9α,11β-dichloro-16α,17α-isopropylidenedioxy-1,4-pregnadiene-3,20-dione is oxidized to the 21-aldehyde; the latter is converted, under the conditions set out in Example 1(b), with butanol into the butyl ester of 6α-fluoro-9α,11β-dichloro-16α,17α-isopropylidenedioxyy-3,20-dioxo-1,4-pregnadien-21-oic acid. Yield: 37 mg., m.p. 246° C. $[\alpha]_D^{25} = +84°$ (chloroform). UV: $\epsilon_{237} = 16,100$ (methanol).

EXAMPLE 21

Under the conditions set forth in Example 1(a), 500 mg. 6α,11β-difluoro-9α-chloro-16α,17α-isopropylidenedioxy-1,4-pregnadiene-3,20-dione is oxidized to the 21-aldehyde, and the latter is converted, under the conditions indicated in Example 1(b), with butanol into the butyl ester of 6α,11β-difluoro-9α-chloro-16α,17α-isopropylidenedioxy-3,20-dioxo-1,4-pregnadien-21-oic acid. Yield: 416 mg., m.p. above 330° C. $[\alpha]_D^{25} = +55°$ (chloroform). UV: $\epsilon_{236} = 15,800$ (methanol).

EXAMPLE 22

Under the conditions set out in Example 1(a), 300 mg. of 6α-fluoro-11β,21-dihydroxy-16α,17α-isopropylidenedioxy-4-pregnene-3,20-dione is oxidized to the 21-aldehyde, and the latter is converted with butanol, under the conditions described in Example 1(b), into the butyl ester of 6α-fluoro-11β-hydroxy-16α,17α-isopropylidenedioxy-3,20-dioxo-4-pregnen-21-oic acid. Yield: 129 mg., m.p. 262° C. (under decomposition). $[\alpha]_D^{25} = +86°$ (chloroform). UV: $\epsilon_{236} = 16,100$ (methanol).

EXAMPLE 23

Under the conditions described in Example 1, 5.0 g. of 11β,21-dihydroxy-16α,17α-isopropylidenedioxy-1,4-pregnadiene-3,20-dione is converted, via the 21-aldehyde, into the methyl ester of 11β-hydroxy-16α,17α-isopropylidenedioxy-3,20-dioxo-1,4-pregnadien-21-oic acid. Yield: 3.8 g.

EXAMPLE 24

1.0 g. of the methyl ester of 11β-hydroxy-16α,17α-isopropylidenedioxy-3,20-dioxo-1,4-pregnadien-21-oic acid is interesterified in butanol under the conditions of Example 5. Yield: 633 mg. of the butyl ester of 11β-hydroxy-16α,17α-isopropylidenedioxy-3,20-dioxo-1,4-pregnadien-21-oic acid.

EXAMPLE 25

500 mg. of 11β-hydroxy-16α,17α-(1-phenylethylidenedioxy)-1,4-pregnadiene-3,20-dione is converted, under the conditions indicated in Example 1, via the 21aldehyde, into the methyl ester of 11β-hydroxy-16α,17α-(1-phenylethylidenedioxy)-3,20-dioxo-1,4-pregnadien-21-oic acid. Yield: 210 mg.

EXAMPLE 26

2.0 g. of 6α-fluoro-21-hydroxy-16α,17α-isopropylidenedioxy-4-pregnene-3,20-dione is converted, under the conditions described in Example 1, via the 21-aldehyde into the methyl ester of 6α-fluoro-16α,17α-isopropylidenedioxy-3,20-dioxo-4-pregnen-21-oic acid. Yield: 940 mg.

EXAMPLE 27

1.0 g. of 21-hydroxy-16α,17α-isopropylidenedioxy-4-pregnene-3,20-dione is oxidized under the conditions set forth in Example 1(a) to the 21-aldehyde, and the latter, under the conditions set forth in Example 1(b), is converted with butanol into the butyl ester of 16α,17α-isopropylidenedioxy-3,20-dioxo-4-pregnen-21-oic acid. Yield: 435 mg.

EXAMPLE 28

750 mg. of 11β,21-dihydroxy-16α,17α-isopropylidenedioxy-6α-methyl-1,4-pregnadiene 3,20-dione is oxidized, under the conditions set forth in Example 1(a), to the 21-aldehyde, and the latter is converted with butanol, under the conditions described in Example 1(b), to the butyl ester of 11β-hydroxy-16α,17α-isopropylidenedioxy-3,20-dioxo-6α-methyl-1,4-pregnadien-21-oic acid. Yield: 320 mg.

EXAMPLE 29

2.0 g. of 21-hydroxy-16α,17α-isopropylidenedioxy-1,4,9(11)-pregnatriene-3,20-dione is converted, under the conditions disclosed in Example 1, via the 21-aldehyde into the methyl ester of 16α,17α-isopropylidenedioxy-3,20-dioxo-1,4,9(11)-pregnatrien-21-oic acid. Yield: 860 mg.

EXAMPLE 30

At −70° C., 3 ml. of hydrogen fluoride is combined with 1 ml. of dimethylformamide, 2 g. of N-chlorosuccinimide, and 860 mg. of the methyl ester of 16α,17α-isopropylidenedioxy-3,20-dioxo-1,4,9(11)-pregnatrien-21-oic acid. The reaction mixture is maintained at −30° C. for 24 hours and then stirred into a mixture of 25 ml. of 25% ammonium hydroxide solution and 25 g. of ice. The thus-precipitated product is filtered off and dissolved in methylene chloride. The solution is washed with water, dried, and evaporated under vacuum. The residue is chromatographed on silica gel with an acetone/hexane gradient (0–30% acetone). Elution yields 220 mg. of the methyl ester of 11β-fluoro-9α-chloro-16α,17α-isopropylidenedioxy-3,20-dioxo-1,4-pregnadien-21-oic acid.

EXAMPLE 31

250 mg. of the butyl ester of 9α-fluoro-11β-hydroxy-16α,17α-isopropylidenedioxy-3,20-dioxo-1,4-pregnadien-21-oic acid is dissolved in 5 ml. of acetone and mixed with 0.25 ml. of a 0.2N chromium(VI) oxide solution in 8N sulfuric acid. After 5 minutes, 1 ml. of methanol is added thereto, the mixture is precipitated with water, the product is filtered, washed neutral with water, and dried under vacuum. After recrystallization from acetone-hexane, the product is 210 mg. of the butyl ester of 9α-fluoro-16α,17α-isopropylidenedioxy-3,11,20-trioxo-1,4-pregnadien-21-oic acid.

EXAMPLE 32

Ointment Composition:

| | |
|---|---|
| 0.10 g. | butyl ester of 9 α-fluoro-11 β-hydroxy-16 α,17 α-isopropylidenedioxy-3,20-dioxo-1,4-pregnadien-21-oic acid |
| 5.00 g. | white wax, DAB [German Pharmacopoeia] 6 |
| 5.00 g. | lanolin, anhydrous DAB 6 |
| 20.00 g. | vaseline, white DAB 6 |
| 25.00 g. | Amphocerin K "Dehydag" |
| 14.98 g. | paraffin oil, liquid DAB 6 |
| 30.00 g. | water, desalted |
| 0.02 g. | "Cremetest" perfume oil No. 6580 "Dragee" |

EXAMPLE 33

Ointment Composition:

| | |
|---|---|
| 0.10 g. | methyl ester of 6 α, 9 α-difluoro-11 β-hydroxy-16 α,17 α-isopropylidenedioxy-3,20-dioxo-1,4-pregnadien-21-oic acid |
| 2.50 g. | "Allercur" hexachlorophenate, micronized, particle size about 8 μ ("Allercur" = registered trademark for 1-p-chlorobenzyl-2-pyrrolidylmethylbenzimidazole) |

EXAMPLE 33-continued

Ointment Composition:

| | |
|---|---|
| 6.00 g. | "Hostaphat KW 340" (tert. ester of o-phosphoric acid and wax alcohol tetraglycol ether) |
| 0.10 g. | sorbic acid |
| 10.00 g. | neutral oil ("Migloyol 812") |
| 3.50 g. | stearyl alcohol |
| 1.50 g. | lanolin, anhydrous DAB 6 |
| 76.30 g. | desalted water |

EXAMPLE 34

Eyedrop Composition:

100 mg. of the butyl ester of 6α-fluoro-9,11β-dichloro-16α,17α-isopropylidenedioxy-3,20-dioxo-1,4-pregnadien-21-oic acid is dissolved in 100 ml. of castor oil. The solution is filtered, after adding 200 mg. of chloramphenicol (or another bacteriostatic agent), under sterile conditions and dispensed aseptically into containers.

EXAMPLE 35

Eardrop Composition:

100 mg. of the ethyl ester of 6α-fluoro-11β-hydroxy-16α,17α-isopropylidenedioxy-3,20-dioxo-1,4-pregnadien-21-oic acid and 200 mg. of chloramphenicol (or of another bacteriostatic agent) are dissolved in 100 ml. of 1,3-propylene glycol/ethanol (9 : 1).

EXAMPLE 36 a. A solution of 560 mg of 21-hydroxy-16α,17α-isopropylidenedioxy-1,4-pregnadiene-3,20-dione in methanol is reacted under the conditions described in Example 1(a). The yield is 729 mg of 16α,17α-isopropylidenedioxy-3,20-dioxo-1,4-pregnadien -21-al as the crude product.

b. 729 mg of the thus-obtained aldehyde is reacted under the conditions described in Example 1(b) but with the use of ethanol. The yield is 284 mg of the ethyl ester of 16α,17α-isopropylidenedioxy-3,20-dioxo-1,4-pregnadien -21-oic acid; m.p. 207°–208° C. $[\alpha]_D^{25} = +33°$ (chloroform).

EXAMPLE 37 a. A solution of 700 mg of 21-hydroxy-16α,17α-isopropylidenedioxy-1,4-pregnadiene-3,20-dione in methanol is reacted under the conditions described in Example 1(a) to 16α,17α-isopropylidenedioxy-3,20-dioxo-1,4-pregnadien -21-al.

b. The thus-obtained aldehyde is reacted under the conditions described in Example 1(b) but with the use of butanol. Yield: 318 mg of the butyl ester of 16α,17α-isopropylidenedioxy-3,20-dioxo-1,4-pregnadien -21-oic acid; m.p. 145°–146° C $[\alpha]_D^{25} = +34°$ (chloroform).

EXAMPLE 38 a. A solution of 500 mg of 21-hydroxy-16α,17α-isopropylidenedioxy-1,4,9(11)-pregnatriene-3,20-dione in methanol is reacted under the conditions indicated in Example 1(a) to 16α,17α-isopropylidenedioxy-3,20-dioxo-1,4,9(11)-pregnatrien -21-al.

b. The thus-obtained aldehyde is reacted under the conditions described in Example 1(b) but with the use of ethanol. The yield is 290 mg of the ethyl ester of 16α,17α-isopropylidenedioxy-2,20-dioxo-1,4,9(11)- pregnatrien -21-oic acid; m.p. 122°–123° C. $[\alpha]_D^{25} = -22°$ (chloroform).

EXAMPLE 39 a. A solution of 700 mg of 21-hydroxy-16α,17α-isopropylidenedioxy-1,4,9(11)-pregnatriene-3,20-dione in methanol is reacted under the conditions set forth in Example 1(a) to 16α,17α-isopropylidenedioxy-3,20-dioxo-1,4,9(11)-pregnatrien -21-al.

b. The thus-obtained aldehyde is reacted under the conditions described in Example 1(b) but with the use of butanol. Yield: 175 mg of the butyl ester of 16α,17α-isopropylidene-dioxy-3,20-dioxo-1,4,9(11)-pregnatrien -21-oic acid. $[\alpha]_D^{25} = -22°$ (chloroform).

EXAMPLE 40

700 mg of 11β,21-dihydroxy-16α,17α-isopropylidene-dioxy-1,4-pregnadiene-3,20-dione is oxidised under the conditions set forth in Example 1b) to the 21-aldehyde and the latter is converted with ethanol to the ethyl ester of 11β-hydroxy-16α,17α-isopropylidenedioxy-3,20-dioxo-1,4-pregnadien -21-oic acid. Yield: 331 mg, m.p. 260°–261° C. $[\alpha]_D^{25} = +53°$ (chloroform).

EXAMPLE 41

560 mg of 11β,21-dihydroxy-16α,17α-isopropylidene-dioxy-1,4-pregnadiene-3,20-dione is oxidised to the 21-aldehyde and the latter is converted under the conditions as described in Example 1(b) but with use of cyclohexanol to 141 mg of the cyclohexyl ester of 11β-hydroxy-16α,17α-isopropylidenedioxy-3,20-dioxo-1,4-pregnadien -21-oic acid; m.p. 274°–275° C. $[\alpha]_D^{25} = +58°$ (chloroform).

EXAMPLE 42

500 mg. of 9α-chloro-11β,21-dihydroxy-16α,17α-isopropylidenedioxy-1,4-pregnadiene-3,20-dione is oxidised to the 21-aldehyde and the latter is converted under the conditions as described in Example 1(b) but with the use of butanol to 185 mg of the butyl ester of 9α-chloro-11β-hydroxy-16α,17α-isopropylidenedioxy-1,4-pregnadien -21-oic acid; m.p. 247°–248,5° C (under decomposition). $[\alpha]_D^{25} = +75°$ (pyridin).

EXAMPLE 43

500 mg of 21-hydroxy-16α,17α-isopropylidenedioxy-1,4-pregnadiene-3,11,20-trione is oxidised to the 21-aldehyde and the latter is converted under the conditiones as described in Example 1(b) but with the use of ethanol to 161 mg of the ethyl ester of 16α,17α-isopropylidenedioxy-3,11,20-trioxo-1,4-pregnadien -21-oic acid; m.p. 184°–185° C. $[\alpha]_D^{25} = +105°$ (chloroform).

EXAMPLE 44

600 mg of 21-hydroxy-16α,17α-isopropylidenedioxy-1,4-pregnadiene-3,11,20-trione is oxidised to the 21-aldehyde and the latter is converted under the condition as described in Example 1(b) but with the use of butanol to 301 mg of the butyl ester of 16α,17α-isopropylidene-dioxy-3,11,20-trioxo-1,4-pregnadien -21-oic-acid; m.p. 131°–133° C. $[\alpha]_D^{25} = +96°$ (chloroform).

EXAMPLE 45

500 mg of the butyl ester of 9α-chloro-11β-hydroxy-16α,17α-isopropylidenedioxy-1,4-pregnadien -21-oic acid in methylene chlorid is treated for 90 minutes with Collins reagent. The reaction solution is mixed with water, the precipitate is isolated recristalised with acetone-hexane and yield 420 mg of the butyl ester of 9α-chloro-16α,17α-isopropylidenedioxy-3,11,20-trioxo-1,4-pregnadien -21-oic acid; m.p. 198°–200° C. $[\alpha]_D^{25} = +153°$ (chloroform).

EXAMPLE 46

750 mg of 9α,11β-dichloro-21-hydroxy-16α,17α-isopropylidenedioxy-1,4-pregnadiene-3,20-dione is oxidised to the 21-aldehyde and the latter is converted under the conditions as described in Example 1(b) but with the use of butanol to 300 mg of the butyl ester of 9α,11β-dichloro-16α,17α-isopropylidene-dioxy-3,20-dioxo-1,4-pregnadien -21-oic acid; m.p. 242–243° C. $[\alpha]_D^{25} = +101°$ (chloroform).

EXAMPLE 47

1,9 g of 9α-fluoro-11β-hydroxy-16α,17α-isopropylidene-dioxy-3,20-dioxo-1,4-pregnadien -21-al is converted under the conditions as described in Example 1(b) but with use of cyclohexanol to 451 mg of the cyclohexyl ester of 9α-fluoro-11β-hydroxy-16α,17α-isopropylidenedioxy-3,20-dioxo-1,4-pregnadien-21-oic acid; m.p. 274° C (under decomposition). $[\alpha]_D^{25} = +64°$ (pyridin).

EXAMPLE 48

700 mg of 9α-fluoro-11β-hydroxy-16α,17α-isopropylidene-dioxy-3,20-dioxo-1,4-pregnadien -21-oic acid is dissolved in 200 ml of methanol, mixed with 1 ml of a concentrated solution of ammonium hydroxide and evaporated under vacuum. The residue is treated with diisopropyl ether and dried under vacuum. Yield: 482 mg of the ammonium salt of 9α-fluoro-11β-hydroxy-16α,17α-isopropylidenedioxy-3,20-dioxo-1,4-pregnadien -21-oic acid; m.p. 239° C $[\alpha]_D^{25} = +31°$ (methanol).

EXAMPLE 49

3,4 g of 6α-fluoro-21-hydroxy-16α,17α-isopropylidene-dioxy-4-pregnene-3,20-dione is oxidised to the 21-aldehyde and the latter is converted under the conditions described in Example 1(b) but with use of butanol to 1,63 g of the butyl ester of 6α-fluoro-16α,17α-isopropylidenedioxy-4-pregnen -21-oic acid; m.p. 185° C. $[\alpha]_D^{25} = +56°$ (chloroform).

EXAMPLE 50

A solution of 1,0 g of the butyl ester of 6α-fluoro-16α,17α-isopropylidenedioxy-3,20-dioxo-4-pregnen -21-oic acid is mixed with 1.0 g of 2,3-dichloro-5,6-dicyanobenzochinon and refluxed for 3 hours. The reaction mixture is evaporated under vacuum and the residue chromatographed on silica gel. With 12 –20 % acetone/hexane, after recristallisation from acetone/hexane, the product thus-obtained is 450 mmg of the butyl ester of 6α-fluoro-16α,17α-isopropylidene-dioxy-3,20-dioxo-1,4-pregnadien -21-oic acid; m.p. 197° C. $[\alpha]_D^{25} = +26°$ (chloroform).

EXAMPLE 51

1.5 g 21-hydroxy-16α,17α-isopropylidenedioxy-3,20-dioxo-1,4-pregnadien -3,20-dione is oxidised to the 21-aldehyde and the latter is converted under the conditions described in Example 1(b) to 800 mg of the methyl ester of 16α,17α-isopropylidenedioxy-3,20- dioxo-1,4-pregnadien -21-oic acid; m.p. 216° C $[\alpha]_D^{25}$ = +39° (chloroform).

EXAMPLE 52

500 mg of the methyl ester of 16α,17α-isopropylidene-dioxy-3,20-dioxo-1,4-pregnadien -21-oic acid is saponified under the conditions described in Example 11. Yield: 450 mg 16α,17α-isopropylidenedioxy-3,20-dioxo-1,4-pregnadien -21-oic acid; m.p. 234° C (under decomposition). $[\alpha]_D^{25}$ = +44° (methanol).

EXAMPLE 53

200 mg of 16α,17α-isopropylidenedioxy-3,20-dioxo-1,4-pregnadien -21-oic acid is converted under the conditions described in Example 12 to 180 mg of the sodium salt of 16α,17α-isopropylidenedioxy-3,20-dioxo-1,4-pregnadien -21-oic acid; m.p. above 300°C. $[\alpha]_D^{25}$ = +20° (methanol).

EXAMPLE 54

Under the conditions set forth in Example 1(a) 800 mg of 21-hydroxy-16α,17α-isopropylidenedioxy-1,4-pregnadiene-3,20-dione is oxidises to the 21-aldehyde, and the latter is converted, under the conditions indicated in Example 1(b), with cyclohexanol into the cyclohexyl ester of 16α,17α-isopropylidenedioxy-3,20-dioxo-1,4-pregnadien -21-oic acid; Yield: 344 mg.

EXAMPLE 55

Under the conditions set forth in Example 1(a) 1.0 g 9α-fluoro-11β,21-dihydroxy-16α,17α-(1'-phenylethylidenedioxy)-1,4-pregnadiene-3,20-dion is oxidised to the 21-aldehyde, and the latter is converted, under the conditions indicated in Example 1(b) with butanol into the butyl ester of 9α-fluoro-11β-hydroxy-16α,17α-(1'-phenylethylidenedioxy)-3,20-dioxo-1,4-pregnadien-21-oic acid; m.p. 217° C $[\alpha]_D^{25}$ = −32° (chloroform). Yield: 570 mg.

EXAMPLE 56

590 mg of 11α,21-dihydroxy-16α,17α-(1'-phenylethylidene-dioxy)-1,4-pregnadiene-3,20-dione is oxidised to the 21-aldehyde, the latter is converted, under the conditions described in Example 1(b) but with use of butanol to 261 mg of the butyl ester of 11β-hydroxy-16α,17α-(1'-phenylethylidenedioxy)-3,20-dioxo-1,4-pregnadien -21-oic acid; m.p. 211° C $[\alpha]_D^{25}$ = −26° (chloroform).

EXAMPLE 57 a. A solution of 1.06 g of 11β,21-diacetoxy-1,4,16-pregnatriene-3,20-dione in 100 ml of acetone and 1.5 ml of anhydrous acetic acid is treated at 0° C with a solution of 440 mg of potassium permanganate in 80 ml of acetone. The reaction mixture is filtered, the filtrate diluted with methylene chloride and washed with sodium hydrogen-carbonate solution. After washing the organic phase is evaporated under vacuum, and yield 1.03 g of 16α,17α-dihydroxy-11β,21-diacetoxy-1,4-pregnadiene-3,20-dione.

b. The thus obtained glycol is dissolved in 140 ml of acetone and 1 ml of perchloric acid and stirred at room temperature for one hour. The reaction mixture is then mixed with water and methylene chloride, washed with water and evaporated under vacuum. Yield: 1.15 g of 16α,17α-isopropylidene-dioxy-11β,21-diacetoxy-1,4-pregnadiene-3,20-dione; m.p. 252°–253° C. $[\alpha]_D^{25}$ = + 133° (chloroform).

c. A solution of 1.0 g 16α,17α-isopropylidenedioxy-11β,21-diacetoxy-1,4-pregnadiene-3,20-dione in 120 ml of methanol is mixed with 1 ml of 10 % potassium carbonat solution and stirred at room temperature for 20 minutes. The reaction mixture is then neutralised with acetic acid, evaporated under vacuum. The residue is dissolved in water and methylene chlorid, the organic phase is washed and evaporated and the residue chromatographed on thin layer plates to yield 450 mg of 21-hydroxy-16α,17α-isopropylidenedioxy-11β-acetoxy-1,4-pregnadiene-3,20-dione; m.p. 133°–134° C. $[\alpha]_D^{25}$ = + 91° (methanol).

d. 500 mg of 21-hydroxy-16α,17α-isopropylidenedioxy-11β-acetoxy-1,4-pregnadiene-3,20-dione is oxidised under the conditions described in Example 1(a). Yield: 596 mg 16α,17α-isopropylidenedioxy-11β-acetoxy-3,20-dioxo-1,4-pregnadien -21-al.

e. 596 mg of the 21-aldehyde thus-obtained is converted under the conditions described in Example 1(b) but with use of butanol to 208 mg of the butyl ester of 16α,17α-isopropylidene-dioxy-11β-acetoxy-3,20-dioxo-1,4-pregnadien -21-oic acid; m.p. 210°–211° C $[\alpha]_D^{25}$ = + 70° (chloroform).

EXAMPLE 58 a. 500 mg of 21-hydroxy-16α,17α-isopropylidene-dioxy-11β-acetoxy-1,4-pregnadiene-3,20-dione is oxidised under the conditions set forth in Example 1(a) to 16α,17α-isopropylidene-dioxy-11β-acetoxy-3,20-dioxo-1,4-pregnadiene-21-al.

b. The 21-aldehyd thus-obtained is converted under the conditions described in Example 1(b) to 213 mg of the ethyl ester of 16α,17α-isopropylidenedioxy-11β-acetoxy-3,20-dioxo-1,4-pregnadien -21-oic acid; m.p. 110–111,5° C. $[\alpha]_D^{25}$ = +69° (chloroform).

EXAMPLE 59

400 mg of the butyl ester of 11β-hydroxy-16α,17α-isopropylidenedioxy-3,20-dioxo-1,4-pregnadien-21-oic acid is mixed with 8 ml of pyridine, 2.4 ml of propionic acid anhydride and 24 mg of 4-dimethylaminopyridine. The mixture is stirred at room temperature for 16 hours. The reaction mixture is then poured in ice water, extracted with methylene chloride, the methylene chloride extract evaporated under vacuum and the residue chromatographed on silica gel thin layer plates. Yield: 355 mg of the butyl ester of 16α,17α-isopropylidene-dioxy-11β-propionyloxy-3,20-dioxo-1,4-pregnadien-21-oic acid. $[\alpha]_D^{25}$ = + 62° (chloroform).

EXAMPLE 60

3 g of 11β,21-diformyloxy-1,4,16-pregnatriene-3,20-dione are converted under the conditions described in Example 57 to the butyl ester of 16α,17α-isopropylidenedioxy-11β-formyloxy-3,20-dioxo-1,4-pregnadien-21-oic acid. Yield: 146 mg; m.p. 156°–157 ° C. $[\alpha]_D^{25}$ = + 79° (chloroform).

EXAMPLE 61

500 mg of the butyl ester of 9α-chloro-11β-hydroxy-16α,17α-isopropylidenedioxy-3,20-dioxo-1,4-pregnadien-21-oic acid is converted under the conditions described in Example 59 but with use of acetic anhydride to 440 mg of the butyl ester of 9α-chloro-16α,17α-isopropylidenedioxy-11β-acetoxy-3,20-dioxo-1,4-pregnadien-21-oic acid; m.p. 207,5 –208,5° C. $[\alpha]_D^{25}$ = +82° (chloroform).

EXAMPLE 62

700 mg of the butyl ester of 9α-fluoro-11β-hydroxy-16α,17α-isopropylidenedioxy-3,20-dioxo-1,4-pregnadien-21-oic acid is converted under the conditions described in Example 59 but with use of acetic acid anhydride to 586 mg of the butyl ester of 9α-fluoro-16α,17α-isopropylidenedioxy-11β-acetoxy-3,20-dioxo-1,4-pregnadien-21-oic acid acid; m.p. 228° C. $[\alpha]_D^{25} = +65°$ (chloroform).

EXAMPLE 63

560 mg of the butyl ester of 9α-fluoro-11β-hydroxy-16α,17α-1'-phenylethylidenedioxy)-3,20-dioxo-1,4-pregnadien-21-oic acid is converted under the conditions described in Example 59 but with use of acetic acid anhydride to 495 mg of the butyl ester of 9α-fluoro-16α,17α-(1'-phenylethylidene-dioxy)-11β-acetoxy-3,20-dioxo-1,4-pregnadien-21-oic acid; m.p. 177° C. $[\alpha]_D^{25} = -18°$ (chloroform).

EXAMPLE 64

610 mg of the 21-hydroxy-16α,17α-(1'-phenylethylidene-dioxy)-11β-acetoxy-1,4-pregnadiene-3,20-dione acid is converted under the conditions described in Example 57(d) to the 21-aldehyde and the latter is converted under the conditions set forth in Example 57(e) to 168 mg of the butyl ester of 16α,17α-(1'-phenylethylidenedioxy)-11β-acetoxy-3,20-dioxo-1,4-pregnadien-21-oic acid; m.p. 163° C. $[\alpha]_D^{25} = -18°$ (chloroform).

EXAMPLE 65

550 mg of the methyl ester of 11β-hydroxy-16α,17α-(1'-phenylethylidenedioxy)-3,20-dioxo-1,4-pregnadien-21-oic acid is converted under the conditions set forth in Example 59 but with use of acetic acid anhydride to 500 mg of the methyl ester of 16α,17α-(1'-phenylethylidenedioxy)-11β-acetoxy-3,20-dioxo-1,4-pregnadien-21-oic acid; m.p. 184° C. $[\alpha]_D^{25} = -6°$ (chloroform).

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. Pregnanoic acid derivatives of the formula

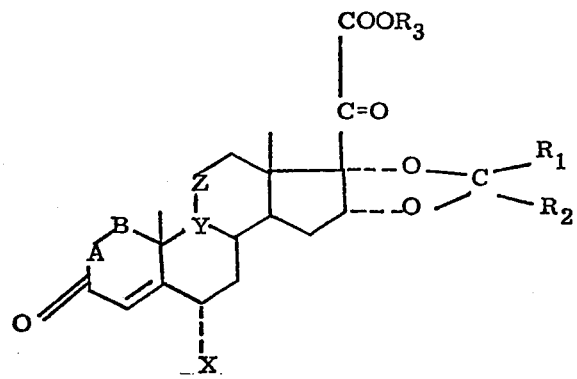

wherein —A—B— is —CH$_2$—CH$_2$—, —CH=CH—, or —CCl=CH—; X is a hydrogen atom, a halogen atom, or methyl; —Y—Z— is —CH—CH$_2$—, —C=CH—, —CV—CHOU—, —CV—CO—, —CW—CHW'—, wherein U is a hydrogen atom or acyl, V is a hydrogen atom or a halogen atom, and W and W' each are a halogen atom; R$_1$ is alkyl; R$_2$ is alkyl or aryl; or R$_1$ and R$_2$ together are tetramethylene or pentamethylene, and R$_3$ is a hydrogen atom; an alkali metal atom, or hydrocarbon.

2. A compound of claim 1, methyl ester of 9 α-fluoro-11β-hydroxy-16α,17α-isopropylidenedioxy-3,20-dioxol,4-pregnadien-21-oic acid.

3. A compound of claim 1 butyl ester of 9α-fluoro-11β-hydroxy-16α,17α-isopropylidenedioxy-3,20-dioxo-1,4-pregnadien-21-oic acid.

4. A compound of claim 1, pentyl ester of 9α-fluoro-11β-hydroxy-16α,17α-isopropylidenedioxy-3,20-dioxo-1,4-pregnadien-21-oic acid.

5. A compound of claim 1, propyl ester of 9α-fluoro-11β-hydroxy-16α,17α-isopropylidenedioxy-3,20-dioxo-1,4-pregnadien-21-oic acid.

6. A compound of claim 1, isopropyl ester of 9α-fluoro-11β-hydroxy-16α,17α-isopropylidenedioxy-3,20-dioxo-1,4-pregnadien-21-oic acid.

7. A compound of claim 1, ethyl ester of 9 α-fluoro-11β-hydroxy-16 α,17 α-isopropylidenedioxy-3,20-dioxo-1,4-pregnadien-21-oic acid.

8. A compound of claim 1, decyl ester of 9 α-fluoro-11 β-hydroxy-16 α, 17 α-isopropylidenedioxy-3,20-dioxo-1,4-pregnadien-21-oic acid.

9. A compound of claim 1, propenyl ester of 9 α-fluoro-11β-hydroxy-16 α,17α-isopropylidenedioxy-3,20-dioxo-1,4-pregnadien-21-oic acid.

10. A compound of claim 1, propynyl ester of 9α-fluoro-11 β-hydroxy-16 α,17 α-isopropylidenedioxy-3,20-dioxo-1,4-pregnadien-21-oic acid.

11. A compound of claim 1, 9 α-fluoro-11 β-hydroxy-16α,17α-isopropylidenedioxy 3,20-dioxo-1,4-pregnadien-21 oic acid and the sodium salt thereof.

12. A compound of claim 1, methyl ester of 6 α,9 α-difluoro-11 β-hydroxy-16 α17 α-isopropylidenedioxy-3,20-dioxo-1,4-pregnadien-21-oic acid.

13. A compound of claim 1, butyl ester of 6α,9α-difluoro-11 β-hydroxy-16α, 17 α-isopropylidenedioxy-3,20-dioxo-1,4,pregnadien-21-oic acid.

14. A compound of claim 1, butyl ester of 6α-fluoro-9 α-chloro-11 β-hydroxy- 16 α,17α-isopropylidenedioxy-3,20 pdioxo-1,4-pregnadien-21-oic acid.

15. A compound of claim 1, methyl ester of 6 α-fluoro-9 α-fluoro-9α-chloro-11β-hydroxy-16 α,17α-isopropylidenedioxy-3,20-dioxo-1,4,pregnadien-21-oic acid.

16. A compound of claim 1, ethyl ester of 6α-fluoro-11β-hydroxy-16 α,17α-isopropylidenedioxy-3,20-dioxo-1,4-pregnadien-21-oic acid.

17. A compound of claim 1, butyl ester of 6α-fluoro-11β-hydroxy-16 α,17 α-isopropylidenedioxy-3,20-dioxo-1,4-pregnadien-21-oic acid.

18. A compound of claim 1, methyl ester of 6α-fluoro-9α,11β-dichloro-16α,17 α-isopropylidenedioxy-3,20-dioxo-1,4-pregnadien -21-oic acid.

19. A compound of claim 1, butyl ester of 6α-fluoro-9α,11β-dichloro-16α,17 α-isopropylidenedioxy 3,20-dioxo-1,4-pregnadien-12-oic acid.

20. A compound of claim 1, butyl ester of 6α,11β-difluror-9α-chloro-16α,17α-isopropylidenedioxy-3,20-dioxo-1,4-pregnadien-21-oic acid.

21. A compound of claim 1, butyl ester of 6α-fluoro-11β-hydroxy-16 α,17α-isopropylidenedioxy-3,20-dioxo-4-pregnen-21-oic acid.

22. A compound of claim 1, ester of 11 β-hydroxy-16α,17α-isopropylidene-dioxy-3,20-dioxo-1,4-pregnadien-21-oic acid.

23. A compound of claim 1, butyl ester of 11β-hydroxy-16 α,17α-isopropylident-dioxy-3,20-dioxo-1,4-pregnadien-21-oic acid.

24. A compound of claim 1, methyl ester of 11α-hydroxy-16α, 17α-(1-phenylethyl-idenedioxy)-3,20-dioxo-1,4-pregnadien-21-oic acid.

25. A compound of claim 1, methyl ester of 6α-fluoro-16 α, 17α-isopropylidenedioxy-3,20-dioxo-4-pregnen-21-oic acid.

26. A compound of claim 1, butyl ester of 16α,17α-isopropylidenedioxy-3,20-dioxo-4-pregnen-21-oic acid.

27. A compound of claim 1, butyl ester of 11β-hydroxy-,17α-isopropylidene-dioxy-3,20-dioxo-6α-methyl-1,4-pregnadien-21-oic acid.

28. A compound of claim 1, methyl ester of 16α,17α-isopropylidenedioxy-3,20-dioxo-1,4,9(11)-pregnatrien-21-oic acid.

29. A compound of claim 1, methyl ester of 11β-fluoro-9 α-chloro-16α,17α-isopropylidenedioxy-3,20-dioxo-1,4-pregnadien-21-oic acid.

30. A compound of claim 1, butyl ester of 9α-fluoro-16α, 17α-isopropylidene-dioxy-3,11,20-trioxo-1,4-pregnadien-21-oic acid.

31. The compounds of claim 1 wherein $R_1$ and $R_2$ ar alkyl of 1–6 carbon atoms.

32. The compounds of claim 1 wherein X is —CVCHOU in which is alkanolyl of 1–6 carbon atoms.

33. The compounds of claim 1 wherein when $R_3$ is hydrocarbon of 1–18 carbon atoms.

34. A pharmaceutical preparation containing a compound of claim 1 in admixture with a pharmaceutically acceptable carrier adapted for topical administration.

35. The preparation of claim 4 wherein the preparation contains 0.001 to 1 % of the compound of claim 1.

36. Process for the preparation of pregnanoic acid derivatives of the general Formula I

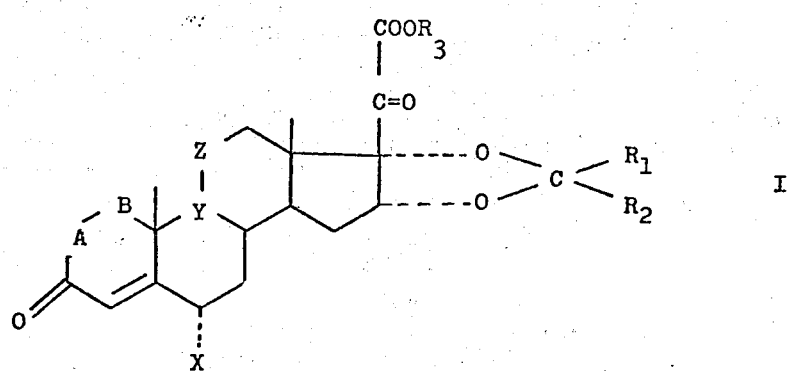

wherein —A—B— is —$CH_2$—$CH_2$, —CH=CH—, or —CCl=CH—, X is a hydrogen atom, a halogen atom, or methyl; —Y—Z— is —CH—$CH_2$—, —C=CH—, —CV—CHOU—, —CV—CO—, —CW—CHW'—, wherein U is a hydrogen atom or acyl, V is a hydrogen atom or halogen atom, and W and W' each are a halogen atom; $R_1$ is alkyl; $R_2$ is alkyl or aryl; or, $R_1$ and $R_2$ together represent a tetramethylene group or pentamethylene group; and $R_3$ is a hydrogen atom, an alkali metal atom, or an hydrocarbon, which comprises preparing said pregnanoic acid derivatives, by procedures as follows:

a. oxidizing a compound of the general Formula II

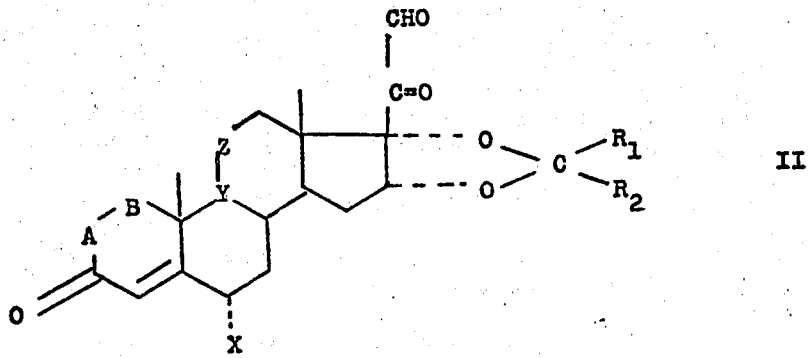

wherein —A—B—, X, Y—Z—, $R_1$, and $R_2$ have the same values given in Formula I, or the hydrates or hemiacetals thereof, with oxidizing heavy metal oxides in the presence of an alcohol to form the corresponding pregnanoic acid derivative;

b. oxidizing a compound of the general Formula III

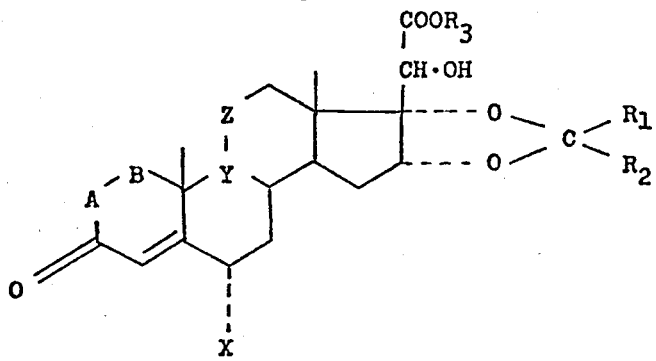

III wherein —A—B—, X, Y—Z—, $R_1$, $R_2$, and $R_3$ have the same values given in Formula I, and wherein the 20-hydroxy group can be in the α-or β-position, in a inert solvent with an oxidizing metallic oxide or metallic salts to form the corresponding pregnanoic acid derivative;

c. chemically adding halogen or hypochlorous or hypobromous acid to the $\Delta^{9(11)}$ -double bond of a compound of the general Formula IV

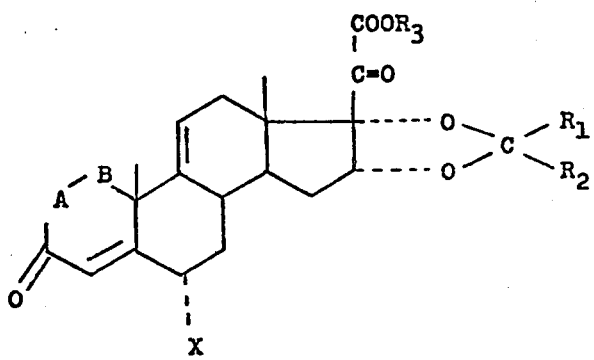

IV wherein —A—B—, X, $R_1$, $R_2$, and $R_3$ have the same values given in Formula I and converting the thus-obtained 9α-halo-11 β-hydroxy steroids into the 9,11 β-epoxide, and the latter is opened with hydrogen fluoride to from the corresponding 9-halo-pregnanoic acid derivatives; and d. the compounds of general Formula I, saturated in the 1,2-position, are dehydrogenated to produce corresponding $\Delta^{1,4}$ pregnanoic acid derivatives.

37. The process of claim 36 wherein 11β-hydroxy compounds of the Formula I are esterified or oxidized to the 11β-ketones.

38. The process of claim 36 wherein ester of the compounds of the Formula I are reacted in the presence of basic catalysts and an alcohol.

39. The process of claim 38 wherein said esters are saponified.

40. The process of claim 36 wherein the alcohol is $R_2OH$, wherein $R_2$ has the same values given in Formula I.

41. The process of claim 36 the oxodizing heavy metal oxide is procedure (a) are selected from the group consisting of silver oxide, lead (IV) oxide, minimum, vanadium (V) oxide, manganese (IV) oxide and chromium (IV) oxide.

42. The process of claim 41 the process is conducted in the presence of cyanide ions as a catalyst.

43. The process of claim 42 the cyanide ions are provided by sodium or potassium cyanide.

44. The process of claim 41 the reaction medium further comprises an alkali-neutralizing amount of acid.

45. A compound of claim 1, ethyl ester of 16α,17α-isopropylidenedioxy-3,20-dioxo-1,4-pregnadien-21-oic acid.

46. A compound of claim 1, butyl ester of 16α,17α-isopropylidenedioxy-3,20-dioxo-1,4-pregnadien-21-oic acid.

47. A compound of claim 1, ethyl ester of 16α,17α-isopropylidenedioxy-3,20-dioxo-1,4,9(11)-pregnatrien-21-oic acid.

48. A compound of claim 1, butyl ester of 16α,17α-isopropylidenedioxy-3,20-dioxo-1,4,9(11)-pregnatrien-21-oic acid.

49. A compound of claim 1, ethyl ester of 11β-hydroxy-16α,17α-isopropylidenedioxy-3,20-dioxo-1,4-pregnadien-21-oic acid.

50. A compound of claim 1, cyclohexyl ester of 11β-hydroxy-16α, 17α-isopropylidene-dioxy-3,20-dioxo-1,4-pregnadien-21-oic acid.

51. A compound of claim 1, butyl ester of 9α-chloro-11β-hydroxy-16α,17α-isopropylidenedioxy-1,4-pregnadien-21-oic acid.

52. A compound of claim 1, ethyl ester of 16α,17α-isopropylidenedioxy-3,11,20-trioxo-1,4-pregnadien-21-oic acid.

53. A compound of claim 1, butyl ester of 16α,17α-isopropylidenedioxy-3,11,20-trioxo-1,4-pregnadien-21-oic acid.

54. A compound of claim 1, butyl ester of 9α-chloro-16α,17α-isopropylidenedioxy-3,11,20-trioxo-1,4-pregnadien-21-oic acid.

55. A compound of claim 1, butyl ester of 9α,11β-dichloro-16α,17α-isopropylidenedioxy-3,20-dioxo-1,4-pregnadien-21-oic acid.

56. A compound of claim 1, cyclohexyl ester of 9α-fluoro-11β-hydroxy-16α,17α-isopropylidenedioxy-3,20-dioxo-1,4-pregnadien-21-oic acid.

57. A compound of claim 1, ammonium salt of 9α-fluoro-11β-hydroxy-16α,17α-isopropylidenedioxy-3,20-dioxo-1,4-pregnadien-21-oic acid.

58. A compound of claim 1, butyl ester of 6α-fluoro-16α,17α-isopropylidenedioxy-4-pregnen-21-oic acid.

59. A compound of claim 1, butyl ester of 6α-fluoro-16α,17α-isopropylidenedioxy-3,20-dioxo-1,4-pregnadien-21-oic acid.

60. A compound of claim 1, methyl ester of 16α,17α-isopropylidenedioxy-3,20-dioxo-1,4-pregnadien-21-oic acid.

61. A compound of claim 1, 16α,17α-isopropylidenedioxy-3,20-dioxo-1,4-pregnadien-21-oic acid.

62. A compound of claim 1, sodium salt of 16α,17α-isopropylidenedioxy-3,20-dioxo-1,4-pregnadien-21-oic acid.

63. A compound of claim 1, cyclohexyl ester of 16α,17α-isopropylidenedioxy-3,20-dioxo-1,4-pregnadien-21-oic acid.

64. A compound of claim 1, butyl ester of 9α-fluoro-11β-hydroxy-16α,17α-(1'-phenylethylidenedioxy)-3,20-dioxo-1,4-pregnadien-21-oic acid.

65. A compound of claim 1, butyl ester of 11β-hydroxy-16α,17α-(1'-phenylethylidenedioxy)-3,20-dioxo-1,4-pregnadien-21-oic acid.

66. A compound of claim 1, butyl ester of 16α,17α-isopropylidenedioxy-11β-acetoxy-3,20-dioxo-1,4-pregnadien-21-oic acid.

67. A compound of claim 1, ethyl ester of 16α,17α-isopropylidenedioxy-11β-acetoxy-3,20-dioxo-1,4-pregnadien-21-oic acid.

68. A compound of claim 1, butyl ester of 16α,17α-isopropylidenedioxy-11β-propionyloxy-3,20-dioxo-1,4-pregnadien-21-oic acid.

69. A compound of claim 1, butyl ester of 16α,17α-isopropylidenedioxy-11β-formyloxy-3,20-dioxo-1,4-pregnadien-21-oic acid.

70. A compound of claim 1, butyl ester of 9α-chloro-16α,17α-isopropylidenedioxy-11β-acetoxy-3,20-dioxo-1,4-pregnadien-21-oic acid.

71. A compound of claim 1, butyl ester of 9α-fluoro-16α,17α-isopropylidenedioxy-11β-acetoxy-3,20-dioxo-1,4-pregnadien-21-oic acid.

72. A compound of claim 1, butyl ester of 9α-fluoro-16α,17α-(1'-phenylethylidenedioxy)-11β-acetoxy-3,20-dioxo-1,4-pregnadien-21-oic acid.

73. A compound of claim 1, butyl ester of 16α,17α-(1'-phenylehtylidenedioxy)-11β-acetoxy-3,20-dioxo-1,4-pregnadien-21-oic acid.

74. A compound of claim 1, methyl ester of 16α,17α-(1'-phenylethylidenedioxy)-11β-acetoxy-3,20-dioxo-1,4-pregnadien-21-oic acid.

* * * * *